United States Patent [19]

Glover et al.

[11] Patent Number: 4,702,701
[45] Date of Patent: Oct. 27, 1987

[54] MULTIPLE SUBSTRUCTURE ANATOMICAL ORGAN MODEL

[76] Inventors: Roy A. Glover, 2617 Esch St., Ann Arbor, Mich. 48104; Peter Coyle, 2790 Danbury La., Ann Arbor, Mich. 48103; Denis C. Lee, 1120 Heather Way, Ann Arbor, Mich. 48104

[21] Appl. No.: 598,514

[22] Filed: Apr. 9, 1984

[51] Int. Cl.$^4$ .............................................. G09B 23/30
[52] U.S. Cl. .................................... 434/270; 434/272
[58] Field of Search ............... 46/1 F; 434/263, 264, 434/267, 270, 274, 272; 446/97; 428/16, 15

[56] References Cited

U.S. PATENT DOCUMENTS

| | | | |
|---|---|---|---|
| 298,746 | 5/1884 | Guirey | 434/270 |
| 1,951,422 | 3/1934 | Klemperer | 434/270 |
| 2,971,272 | 2/1961 | Barlow | 434/272 |
| 2,988,823 | 6/1961 | Rosenbloom | 434/272 |
| 3,009,265 | 11/1961 | Bezark | 434/270 |
| 3,009,267 | 11/1961 | Bezark | 428/16 X |
| 3,106,786 | 10/1963 | Collins | 434/270 |
| 3,106,787 | 10/1963 | Collins | 434/270 |
| 3,213,550 | 10/1965 | Kittner | 446/97 X |
| 3,271,879 | 9/1966 | Sackler | 434/270 |
| 3,775,867 | 12/1973 | Christenberry, Jr. | 434/270 |
| 3,802,096 | 4/1974 | Matern | 434/270 |
| 3,886,661 | 6/1975 | Neill | 434/263 |

Primary Examiner—Henry F. Epstein

[57] ABSTRACT

A modeling arrangement for an anatomical organ is provided with a plurality of substructure models corresponding to predetermined substructures of the anatomical organ. Such substructures may include representations of organs, volumes, vessels, and fluids which assume predetermined shapes with the anatomical organ being modeled. The arrangement is provided with one or more members which define the surface of the anatomical organ being modeled; the members being couplable to a base member. Preferably, all of the members, including the base member, which support the substructures are formed of a transparent material, preferably one of the type marketed under the Plexiglas trademark. The modeling arrangement may be used in conjunction with written instructions to form a self-learning system which is particularly useful for students of anatomy. In one highly advantageous embodiment of the invention, a biological brain, particularly the fore-brain portion, is represented by the inventive modeling scheme.

13 Claims, 8 Drawing Figures

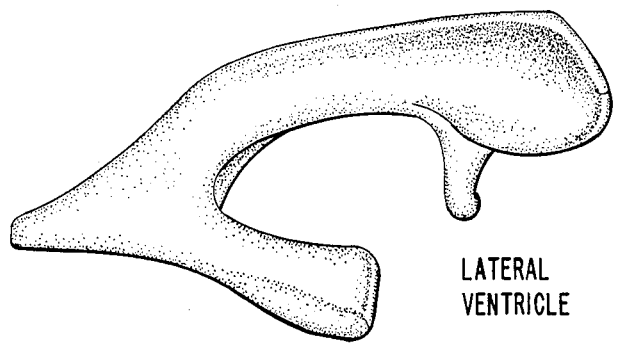
FIG. IA  LATERAL VENTRICLE
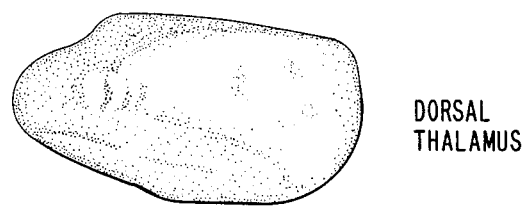
FIG. IB  DORSAL THALAMUS
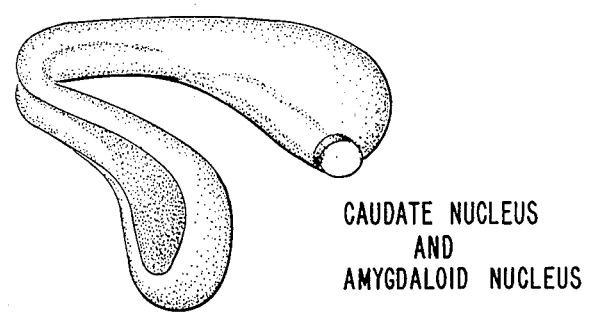
FIG. IC  CAUDATE NUCLEUS AND AMYGDALOID NUCLEUS

MULTIPLE SUBSTRUCTURE ANATOMICAL ORGAN MODEL

BACKGROUND OF THE INVENTION

This invention relates generally to models of anatomial organs, and more particularly, to an arrangement for modeling anatomical organs, members, and sections having multiple substructures, spaces, and subvolumes.

For many years practitioners of the arts of medical research and modeling have combined their efforts to produce models of anatomical organs, members, and sections, primarily to facilitate medical instruction and learning. Most commonly, an anatomical model will show the three-dimensional configuration of the subject being modeled, and may also include information pertaining to the relationship with other body parts. One example of a structural model system is the well-known skeletal model. In the conventional skeletal model, the various bone members are each replicated three-dimensionally and connected to other bone members to illustrate the cooperation between such members. Such a modeling system is well-suited for representing sequentially communicating body parts, but can not be used to represent the relationship of body members or organs contained within other members or organs. Additionally, such a modeling system does not illustrate to the medical student the location, in a three-dimensional sense, of the modeled body part within the body or other organ.

A known modeling scheme which has been utilized to represent structure, organs, and volumes within an organ contains a plurality of transverse longitudinal sections whereby such interior parts are visible in sequential sections. Such a sectional modeling scheme, however, does not afford the medical student an opportunity to observe the three-dimensional configuration of the substructures and spaces. Also, essential information is lost concerning structures situated within the organ and between the transverse sections. The visualization of all pertinent information concerning the substructures would require an extremely large number of such sections. However, the resulting model would be very cumbersome and inconvenient to use and would nevertheless require a large effort on the part of the student to perceive a three-dimensional figure from such a multiplicity of sections.

It is, therefore, an object of this invention to provide a modeling arrangement for an anatomical organ wherein the relationship between structures, members, spaces, volumes, and other organs, contained within the organ being modeled, can be represented three-dimensionally.

It is another object of this invention to provide a modeling arrangement wherein the relative locations of one or more structures or volumes within a member can be represented three-dimensionally.

It is a further object of this invention to provide a modeling arrangement wherein various substructures and volumes internal to an organ or body section being modeled can be identified easily.

It is also an object of this invention to provide an anatomical model which is suitable for use in conjunction with a written learning program.

It is still a further object of this invention to provide an anatomical model of a brain which shows three-dimensionally predetermined portions within the brain.

It is still another object of this invention to provide a three-dimensional model showing the spatial relationships between selected forebrain structures, including the lateral ventricle, basal ganglia, internal capsule, and dorsal thalamus.

SUMMARY OF THE INVENTION

The foregoing and other objects are achieved by this invention which provides a modeling system for an anatomical organ of the type having a plurality of internal structures and spaces. In accordance with the invention, the modeling system is provided with a plurality of substructure models which correspond to predetermined respective substructures of the anatomical organ. A carrier member supports the substructure models in predetermined orientations and locations corresponding to the anatomical organ. The carrier member, in one embodiment has planar side and an outer edge surface which is contoured to conform to a corresponding portion of the outer surface of the modeled anatomical organ.

In a preferred embodiment of the invention, the substructure models also include models of respective organs within the anatomical organ being modeled, and volumes and spaces therewithin. Generally, such volumes and spaces are occupies by a gas, such as air, or a liquid. Additionally, such substructures and volumes may be identified by selected colors so that the model may be used in conjunction with a prewritten programmed learning system.

The carrier member is preferably formed of a transparent material, such as is commercially available under the trademark Plexiglas, which does not interfere with the visualization of the internal structures and volumes. Additionally, a transverse member formed of material similar to that of the carrier member may be provided to facilitate three-dimensional visualization of the location of the substructures and volumes within the anatomical organ being modeled. The transverse member is provided with an outer edge surface which is contoured to conform to a corresponding portion of the outer surface of the anatomical organ. Thus, the location of the substructures and volumes within the anatomical organ can be visualized readily. In addition to the foregoing, the carrier member may be supported by a base which is also formed of a transparent material so as to facilitate viewing of the substructures and models from underneath.

BRIEF DESCRIPTION OF THE DRAWINGS

Comprehension of the invention is facilitated by reading the following detailed description in conjunction with the annexed drawings, in which:

FIGS. 1A-1E are depictions of models of respective structural elements within a brain organ;

DETAILED DESCRIPTION

Figure 1D:
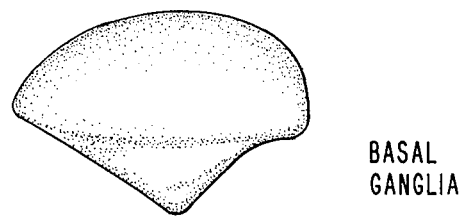
Figure 1E:
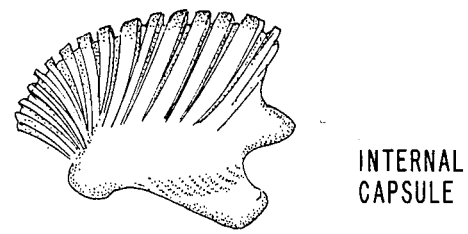

FIGS. 1A-1E show modeled structural elements interior to a brain, the structural elements being formed three-dimensionally so as to correspond to respective elements in a biological brain. FIG. 1A is a model of a lateral ventricle. The lateral ventricle corresponds to a region which is naturally occupied with air and/or fluid. In accordance with the present invention, however, this spatial region is modeled in solid form. FIGS. 1B-1E show a dorsal thalamus, basal ganglia, (cavdate nucleus and amygdaloio nucleus), basal ganglia (lentiform nucleus), and internal capsule, respectively. Each of these elements is configured to simulate a corresponding natural element or organ present in a human brain, and are dimensioned to be properly proportional to one another.

Figure 2:
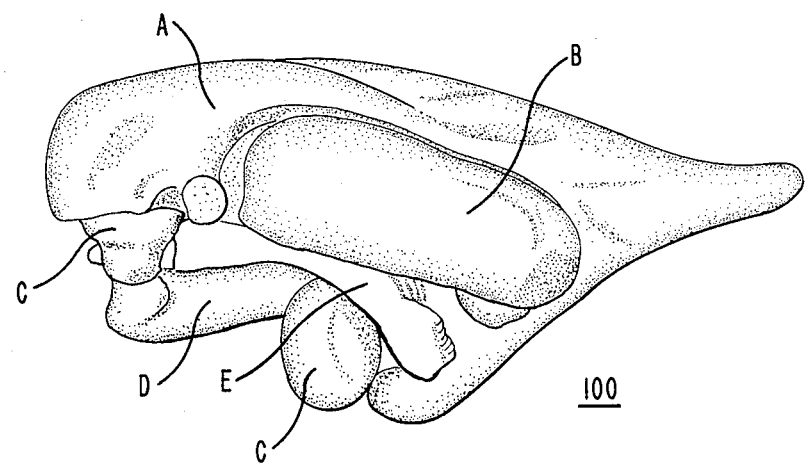
FIG. 2 is a depiction of the structural elements of Figs. 1A-1E assembled and in communication with one another.

FIG. 2 is a side view of the element of FIGS. 1A-1E assembled in their normal state. It is evident from FIG. 2, however, that although the relationship between the various elements is apparent, no information is available in this figure concerning the location of such elements within the brain. In FIG. 2, the various elements are identified with letters which correspond to respective ones of FIG. 1A-1E. The assembly of such modeled structural elements is designated 100.

Figure 3:
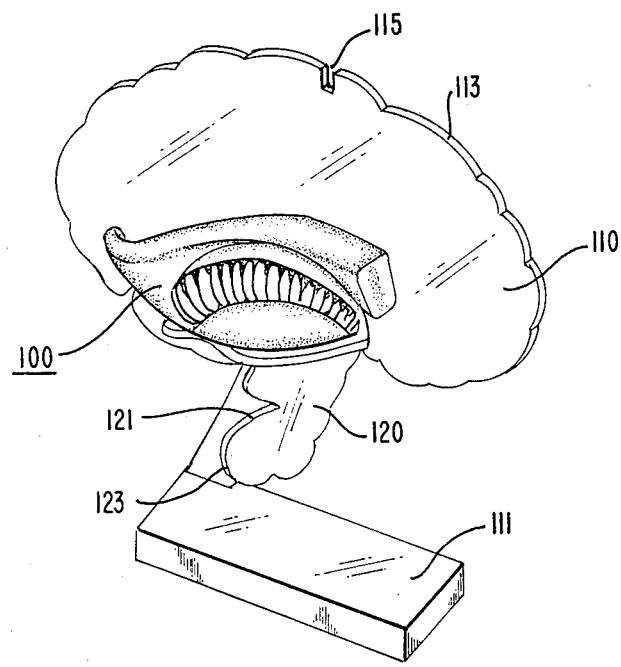
FIG. 3 is an isometric representation of the assembly of FIG. 2 installed on a carrier member supported by a base.

FIG. 3 shows assembly 100 installed on a carrier member 110 which is itself supported by a base member 111. Carrier member 110 has substantially planar sides and an outermost surface 113 which is contoured so as to simulate a corresponding portion of he exterior surface of a biological brain. Surface 113, however, is interrupted by a notch 115 which will be described hereinbelow with respect to FIG. 4. In FIG. 3, carrier member 110 is formed of a transparent material, illustratively one which is sold under the Plexiglas trademark Base member 111 may be formed of a similar material.

FIG. 3 further shows a transverse member 120 which is affixed to carrier member 110 in the vicinity of a pedestal region 121. Fixed transverse member 120 is provided with an outer edge surface 123 which is also contoured to simulate the surface of the biological brain being modeled. Fixed transverse member 120 may be formed of the same material as carrier member 110.

Figure 4:
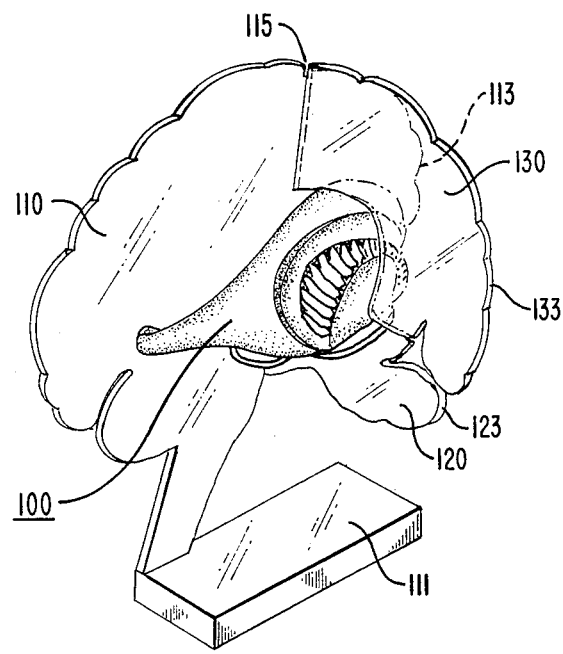
FIG. 4 is an isometric representation of the arrangement of FIG. 3 having a detachable transverse member installed thereon.

FIG. 4 shows an isometrical representation of the embodiment of FIG. 3 further having a detachable transverse member 130 which is arranged to engage with notch 115 of carrier member 110. In this embodiment, detachable transverse member 130 rests at its lower portion on fixed transverse member 120.

Detachable transverse member 130 is provided with an outermost edge surface 133 which is contoured to simulate a corresponding portion of the outer surface of a biological brain. In this embodiment, surface 133 of detachable transverse member 130, surface 123 of fixed transverse member 120 and surface 113 of carrier member 110 assist in defining the outer surface of the biological brain being modeled. Thus, assembly 100 is clearly seen to be located in the lower front portion of the brain.

In the practice of the invention, the anatomical model may be combined with any of several known instruction arrangements, such as a written instruction manual, which will assist a user of the invention in learning about the biological structures represented in the modeling arrangement. Thus, a self-teaching system can be produced.

Although the invention has been described in the context of specific embodiments, persons skilled in the art, in light of this teaching, can generate additional embodiments without exceeding the scope or departing from the spirit of the claimed invention. For example, such skilled persons can generate models of other organs, members, or sections of living beings, which models are intended to be included within the scope of the appended claims. Accordingly, it is to be understood that the drawings and descriptions in this disclosure are proferred to facilitate comprehension of the invention and should not be construed to limit the scope thereof.

What is claimed is:

1. A modeling arrangement for facilitating the study of an anatomical organ of a living being by a student, the anatomical organ having a plurality of internal organ structures and corresponding spaces between said internal organ structures, the spaces being of the type which are normally occupied with gas and fluid, the modeling arrangement comprising:

a plurality of individual and separable substructure models corresponding to predetermined respective ones of the plurality of internal organ structures, said substructure models being removably arranged with respect to one another in accordance with the corresponding internal organ structures of the anatomical organ;

at least one nonorgan space model formed substantially as one of said substructure models, but corresponding to a selected one of the corresponding spaces which are normally occupied with at least one of the gas and fluid, in the vicinity of said substructure models, said space model being removably arranged in adjacency with neighboring one of said substructure models and in accordance with the selected corresponding space of the anatomical organ; and a carrier member for supporting said substructure models and said space model in said accordance with the internal organ structures and spaces of the anatomical organ, said carrier member being formed at least partially as a sheet of transparent material having substantially planar sides and an outer edge substantially transverse to said substantially planar sides, said outer edge being contoured to conform to a corresponding outer surface portion of the modeled anatomical organ whereby said substructure models and said space model are directly accessible by the student while said carrier member is in an anatomically correct location and orientation with respect to said substructure and space models.

2. The modeling arrangement of claim 1 wherein each of said substructure models is a three-dimensional model of one of said respective internal organ structures.

3. The modeling arrangement of claim 2 wherein said three-dimensional models are arranged to communicate with one another whereby at least one of said three-dimensional models communicates with said carrier member via a further one of said three-dimensional models.

4. The modeling arrangement of claim 2 wherein each of said three-dimensional models is color-coded so as to be visually identifiable by a respective associated color.

5. The modeling arrangement of claim 1 wherein there is further provided a transverse member arranged transverse to said carrier member said transverse member being formed at least partially as a sheet of transparent material having substantially planar sides extending substantially orthogonally with respect to said planar sides of said carrier member, and having an outer edge surface contoured to conform to a corresponding outer surface portion of the modeled anatomical organ.

6. The modeling arrangement of claim 5 wherein said transverse member is detachable from said carrier member.

7. The modeling arrangement of claim 1 wherein said member is formed of a transparent material.

8. The modeling arrangement of claim 1 wherein said transparent material is available under the trademark Plexiglas.

9. The modeling arrangement of claim 1 wherein said carrier member is supported by a base member formed of a transparent material.

10. A three-dimensional modeling arrangement for facilitating study of at least a portion of a brain of a living being by a student, the arrangement comprising:
   surface-defining means for defining a portion of an outer surface of the brain, said surface-defining means being formed of at least one sheet of transparent material having substantially parallel planar sides and an edge portion substantially orthogonal to said sides, said edge portion being configured to define said portion of said outer surface of the brain:
   a plurality of individual and separable substructure models of respective biological organs which are naturally arranged at least in the vicinity of the brain of the living being; and
   at least one subspace model corresponding to a selected spatial region which is naturally located in the vicinity of the biological organs of the living being, said spatial region being naturally occupied by at least one of a fluid and a gas, said subspace model being selectably separable from said substructure models, said substructure and space models being directly accessible by the student while said surface-defining means is anatomically correctly arranged with respect thereto.

11. The three-dimensional modeling arrangement of claim 10 wherein said surface-defining means further comprises support means for supporting said plurality of substructure models in respective predetermined locations with respect to said surface-defining means, said locations corresponding to respective natural locations of said respective natural organs.

12. The three-dimensional modeling arrangement of claim 10 wherein said substructure models are arranged to communicate with one another whereby at least one of said substructure models communicates with said surface defining means.

13. The three-dimensional modeling arrangement of claim 10 wherein there is further provided an instruction means for providing to a user of the anatomical organ model instructional information pertaining to the brain of the living being, said biological organs represented by said substructure models, and said spatial region represented by said subspace model, thereby forming a self-teaching system.

* * * * *